United States Patent [19]

Kagawa et al.

[11] Patent Number: 5,401,595
[45] Date of Patent: Mar. 28, 1995

[54] FILM TYPE BATTERY AND LAYER-BUILT FILM TYPE BATTERY

[75] Inventors: Hiroshi Kagawa; Shiro Kato; Kazuo Murata, all of Takatsuki, Japan

[73] Assignee: Yuasa Corporation, Osaka, Japan

[21] Appl. No.: 87,682

[22] PCT Filed: Dec. 2, 1992

[86] PCT No.: PCT/JP92/01577
§ 371 Date: Jul. 8, 1993
§ 102(e) Date: Jul. 8, 1993

[87] PCT Pub. No.: WO93/11572
PCT Pub. Date: Jun. 10, 1993

[30] Foreign Application Priority Data

Dec. 6, 1991 [JP] Japan .................. 3-349531
Dec. 6, 1991 [JP] Japan .................. 3-349532

[51] Int. Cl.6 ............................. H01M 2/26
[52] U.S. Cl. .................. 429/152; 429/162; 429/163; 429/178
[58] Field of Search ............ 429/152, 162, 163, 178

[56] References Cited

U.S. PATENT DOCUMENTS 4,028,479 6/1977 Fanciullo et al. .............. 429/152
5,230,967 7/1993 Radmoll .......................... 429/152

FOREIGN PATENT DOCUMENTS 61-68469 5/1986 Japan .
61-126765 6/1986 Japan .
64-38764 3/1989 Japan .
3241669 10/1991 Japan .

Primary Examiner—Prince Willis, Jr.
Assistant Examiner—M. Nuzzolillo
Attorney, Agent, or Firm—Evenson, McKeown, Edwards & Lenahan

[57] ABSTRACT

A film type battery including a positive current collector plate, a positive active material, electrolytes, a negative active material and a negative current collector plate laminated into a layer structure, wherein the positive active material, the negative active material and the electrolytes are peripherally sealed, the positive current collector plate and the negative current collector plate are integrated by sealing agents, a portion of the positive current collector plate and a portion of the negative current collector plate are not contacted by the active material, the electrolytes or the sealing agents, a positive terminal piece is fitted to the positive current collector plate at a side of the layer structure and a negative terminal piece is fitted to the negative current collector plate at the side of the layer structure.

16 Claims, 12 Drawing Sheets

FILM TYPE BATTERY AND LAYER-BUILT FILM TYPE BATTERY

BACKGROUND OF THE INVENTION

1. Technical Field

This invention relates to a film type battery and a layer-built film type battery. The battery of the invention is useful, for example, in an ID card, a portable telephone, a memory card, a pocket bell, or an electric automobile etc.

2. Background Art

A conventional film type battery is shown in FIG. 27. The conventional film type battery included a sealing agent 2 put around a generating element 1 formed by laminating a positive active material, an electrolyte and a negative active material into a layer structure. A positive current collector plate 3 and a negative current collector plate 4 were disposed above and below the generating element 1, and the generating element 1 was then sealed with both current collector plates 3 and 4 bonded by the sealing agent 2. Terminals 5 were formed by leaving the surfaces of selected corners of both current collector plates 3 and 4 as they were and covering the remaining surfaces by synthetic resin or the like.

Such a film type battery was used also as a layer-built film type battery by being laminated in plural layers as shown by FIG. 28.

However, the internal temperature of the film type battery having the foregoing structure sometimes rises resulting in fire or, in the worst case, bursting, when its power consumption becomes large. This defect is also found in the layer-built film type battery having the foregoing structure.

SUMMARY OF THE INVENTION

An object of this invention is to provide a film type battery and a layer-built film type battery which can be prevented from undergoing a rise in its internal temperature and from catching fire, or even bursting, when power consumption becomes large.

A film type battery is assembled in such a way that a positive current collector plate, a positive active material, electrolytes, a negative active material and a negative current collector plate are laminated into a layer structure, both active materials and the electrolytes are sealed at their peripheries, and both current collector plates are integrated by sealing agents; portions of the respective current collector plates are left free of the active materials, the electrolytes and the sealing agents and terminal pieces are fitted to one side of respective current collector plates.

A first layer-built film type battery is assembled in such a way that a positive active material, electrolytes and a negative active material are laminated into a layer structure to form a generating element, plural generating elements are laminated with positive current collector plates or negative current collector plates put between them, both active materials and the electrolytes are sealed at their peripheries, and both current collector plates are integrated by sealing agents; portions of the respective current collector plates are left free of the active materials, the electrolytes and the sealing agents, terminal pieces are fitted to one side of respective current collector plates, and all of the terminal pieces for the positive current collector plates are joined to each other and all of the terminal pieces for the negative current collector plates are joined to each other, respectively.

A second layer-built film type battery is assembled in such a way that a positive active material, electrolytes and a negative active material are laminated into a layer structure to form a generating element, plural generating elements are laminated with positive current collector plates or negative current collector plates put between them, both active materials and the electrolytes are sealed at their peripheries and both current collector plates are integrated by sealing agents; portions of the respective current collector plates are left free of the active materials, the electrolytes and the sealing agents, the generating elements provided with the both current collectors are laminated with frame members forming ventilating spaces placed between predetermined numbers of generating elements, terminal pieces are fitted to one side of respective current collector plates, and all of the terminal pieces for the positive current collector plates are joined to each other and all of the terminal pieces of the negative current collector plates are joined to each other, respectively.

In the film type battery and the layer-built film type battery of this invention, the portions of the current collector plates which are free of the active materials, the electrolytes and the sealing agents function as radiating fins so that heat radiation is efficiently accomplished.

When a middle part of the terminal piece is constricted, the terminal piece will melt down at the constriction in the event that consumed power exceeds a specified limit. Accordingly, the terminal piece will function as a fuse.

When the terminal piece of the positive current collector plate and the terminal piece of the negative current collector plate are so installed as not to be superimposed when they are seen in plan view, electric short-circuiting can be avoided.

Further, when the radiation fin portion of the positive current collector plate and the radiation fin portion of the negative current collector plate are so installed as not to be superimposed when they are seen in plan view, electric short-circuiting can be avoided.

Moreover, when the middle part of the terminal piece is narrow constricted and the rear part beyond the constricted part is made narrower than the front part, respective terminal pieces of the positive current collector plates are so fitted that only respective front parts are at least partly superimposed when they are seen in plan view, and respective terminal pieces of the negative current collector plates are fitted in the same way; then the positive terminal pieces and the negative terminal pieces can be prevented from being electrically connected to each other by molten-down remains, so that the fuse function can be exercised securely.

When the tip ends of respective terminal pieces are previously coated with zinc, tin-zinc alloy or tin-lead alloy, the terminal pieces can be joined easily.

DESCRIPTION OF THE PREFERRED EMBODIMENTS

Figure 1:
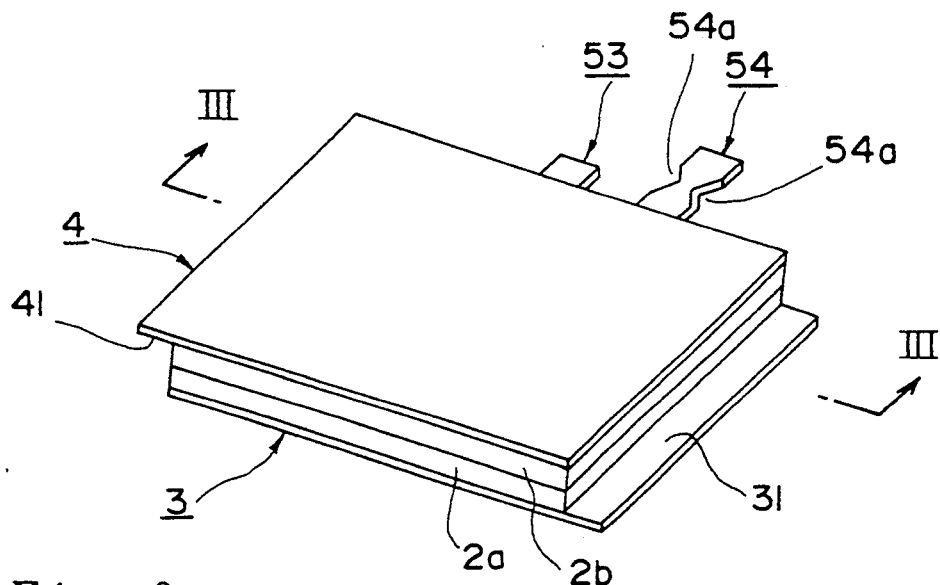
FIG. 1 is a perspective view showing a film type battery according to a first embodiment of the invention.
Figure 2:
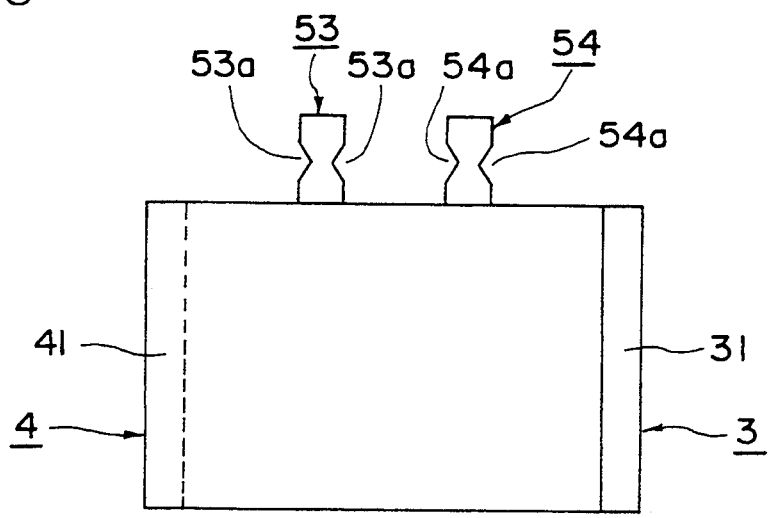
FIG. 2 is a plan view of the embodiment of FIG. 1.
Figure 3:
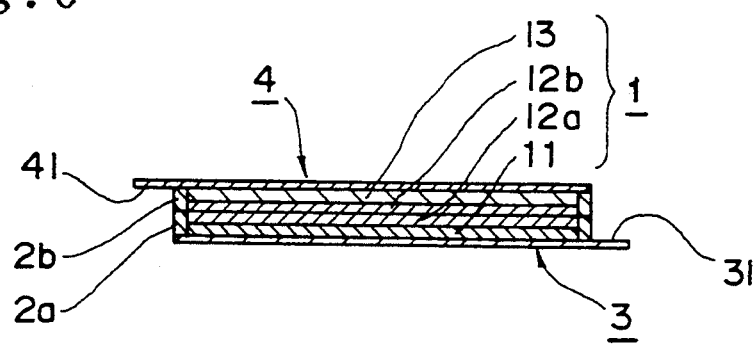
FIG. 3 is a sectional view taken on the line III—III of FIG. 1.

Referring to FIGS. 1-3, the film type battery of the first embodiment is formed by laminating a positive current collector plate 3, a positive active material layer 11, electrolyte layers 12a and 12b, a negative active material layer 13 and a negative current collector plate 4 into a layer structure. The periphery of a generating element 1 comprising both active material layers 11 and 13 and electrolyte layers 12a and 12b is sealed and at the same time both current collector plates 3 and 4 are integrated by sealing agents 2a and 2b.

Both current collector plates 3 and 4 are made of stainless steel, for example. The principal component of the positive active material is manganese dioxide, the negative active material is lithium, the electrolyte is a polymer solid electrolyte prepared by adding lithium perchlorate to polyethylene oxide, and the sealing agents 2a and 2b are a polypropylene-based thermal bonding resin including addition agents. They are not limited to these materials, and a material including carbon may be used for the negative active material.

A portion 31 where the generating element 1 and the sealing agent 2a do not exist is left on one side part of the positive current collector plate 3, and a portion 41 where the generating element 1 and the sealing agent 2b do not exist is left on one side part of the negative current collector plate 4. The portion 31 and the portion 41 are located at opposite ends of the film type battery. In other words, the portion 31 and the portion 41 are so installed as not to be superimposed when the film type battery is observed in a plan view.

A terminal piece 53 is fitted to one side of the positive current collector plate 3, and a terminal piece 54 is fitted to one side of the negative current collector plate 4. In the film type battery, the terminal pieces 53 and 54 are fitted to the ends of positive current collector plate 3 and negative current collector plate 4 opposite portions 31 and 41 and fitted in such a way as not to be superimposed when the film type battery is observed in a plan view. The terminal pieces 53 and 54 are not centrally disposed on the respective current collector plates 3 and 4, but are slightly offset. Notches 53a and 54a are formed from both sides at the middle of the terminal pieces 53 and 54, so that the terminal pieces 53 and 54 are constricted in widths at the middle.

Figure 4:
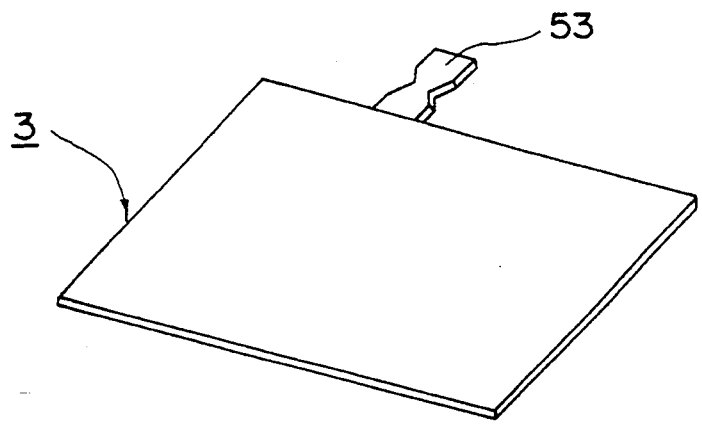
FIGS. 4 to 9 are perspective views showing the steps of the process for forming the film type battery of the first embodiment of the invention.
Figure 5:
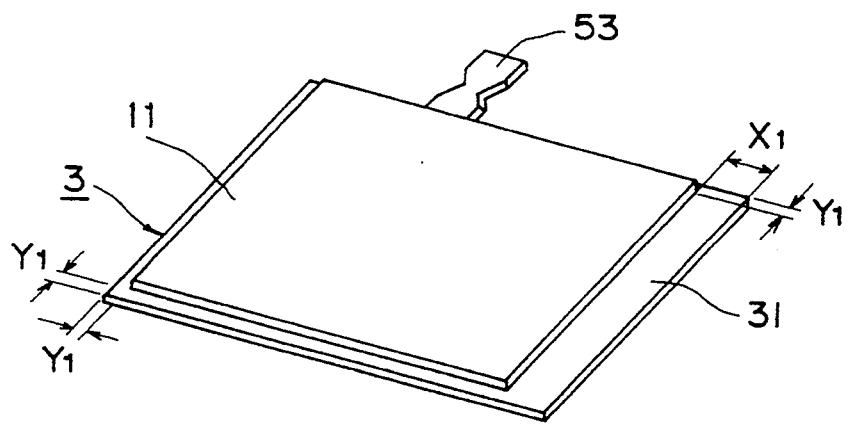

The film type battery having the structure just described is formed by way of the process shown in FIGS. 4 to 9. Specifically, the positive current collector plate 3 fitted with the terminal piece 53 as shown in FIG. 4 is prepared, and a positive active material is screen printed on a surface thereof to form a positive active material layer 11 as shown in FIG. 5. In this instance, the positive active material layer 11 is so formed as to leave a large space on a side which will become the portion 31, and a small space is left on the other side. For example, in the case where the positive current collector plate 3 has a width of 54 mm and a length of 86 mm, the positive active material layer 11 is to be formed into a rectangle having a width of 50 mm and a length of 76 mm, so that $X_1 = 8$ mm is to be left on the end becoming the portion 31 and $Y_1 = 2$ mm is to be left on the other end.

Figure 6:
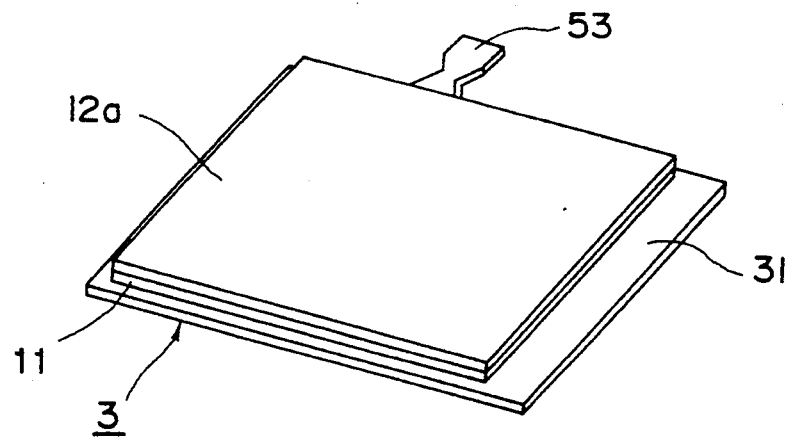

Next, an electrolyte is screen printed on the positive active material layer 11 to form an electrolyte layer 12a as shown in FIG. 6. Then, the sealing agent 2a is put on and bonded to peripheries of the positive active material layer 11 and the electrolyte layer 12a so as to obtain a processed article 100 shown in FIG. 7. In this instance, the sealing agent 2a is applied to fill the portion $Y_1$ (FIG. 5).

Similarly, the negative current collector plate 4 having the same dimensions and shapes as those of the positive current collector plate 3 is prepared. Then, following the same steps as those of FIGS. 4 to 6, the negative active material layer 13 and the electrolyte layer 12b are formed on the negative current collector plate 4 and the sealing agent 2b is further formed so as to obtain a processed article 101 shown in FIG. 8.

Figure 7:
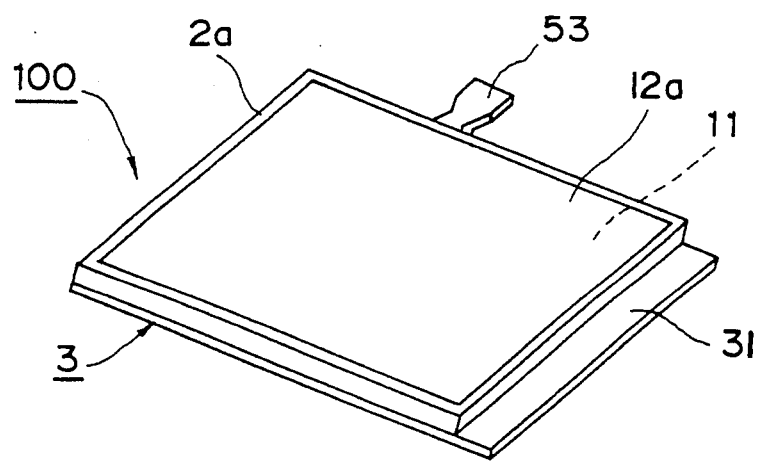
Figure 8:
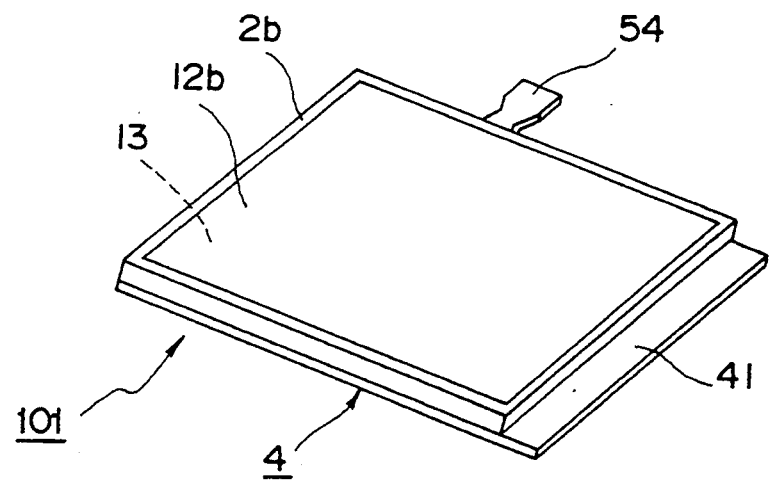
Figure 9:
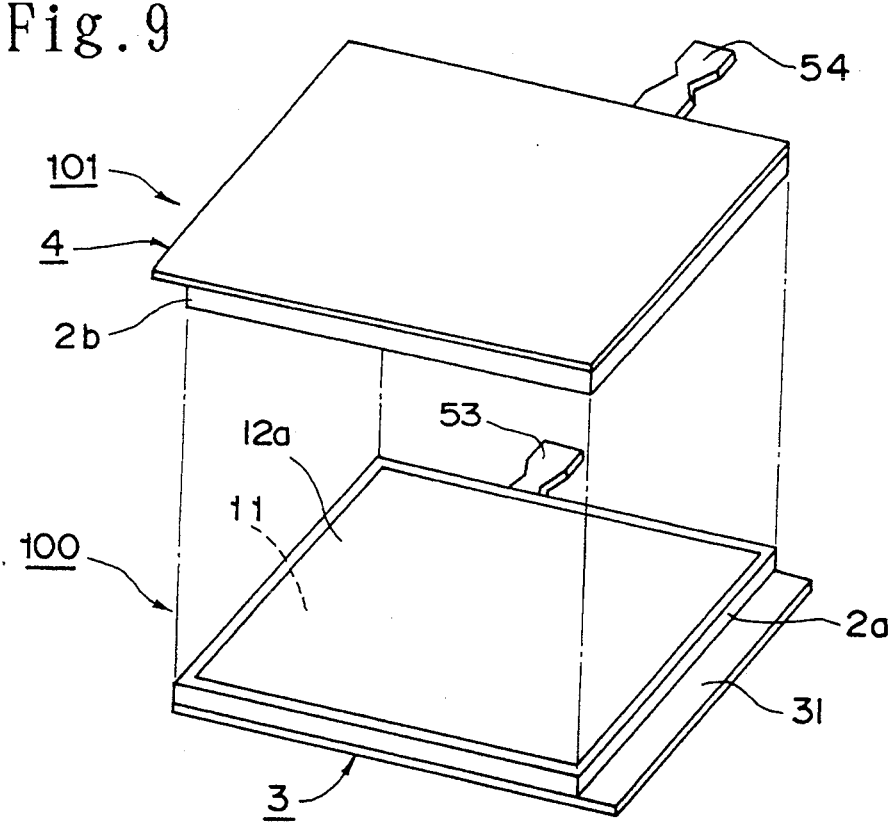

As shown in FIG. 9, the processed article 100 of FIG. 7 and the processed article 101 of FIG. 8 are placed face to face and laid one upon another at electrolyte layers 12a and 12b. The sealing agents 2a and 2b are thermally bonded to each other under reduced pressure, so that the inside, surrounded by both current collector plates 3 and 4 and the sealing agents 2a and 2b, is under reduced pressure and hermetically sealed. The thickness of the generating element 1 is 0.2 to 1.0 mm.

Figure 27:
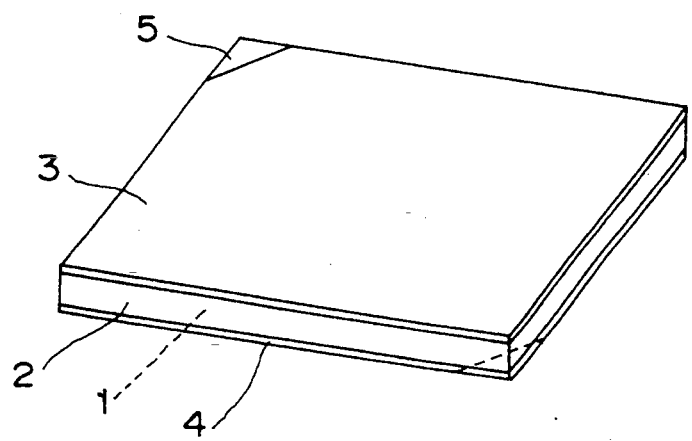
FIG. 27 is a perspective view showing a conventional film type battery.

In the film type battery of this embodiment, there is good heat radiation because portion 31 of the positive current collector plate 3 and portion 41 of the negative current collector plate 4 function as radiation fins. Therefore, the rise of internal temperature in the film type battery of this embodiment can be controlled even when the power consumption becomes large. Maximum values of internal temperature at high-rate discharge of the film type battery of this embodiment and the conventional film type battery shown in FIG. 27 were compared. The value was 57° C. for the conventional battery and 26° C. for the battery of this embodiment. In other words, the rise of internal temperature is controlled to an extremely low value in the battery of this embodiment.

In addition, since portion 31 and portion 41 are so configured as not to be superimposed upon each other when the film type battery is seen in plan view, electric short-circuiting does not occur. Since terminal pieces 53 and 54 are also so configured as not to be superimposed upon each other when the film type battery is seen in plan view, electric short-circuiting does not occur.

Further, since the notches 53a and 54a are formed on the terminal pieces 53 and 54 so that they are constricted at the middle, the pieces 53 and 54 will melt at the narrowed portions when the consumed power exceeds a specified value. In other words, the terminal pieces 53 and 54 also function as fuses. Consequently, an abnormal rise of internal temperature can be avoided and environmental damage caused by fire and bursting of the battery can be prevented.

Moreover, since the processed article 100 of FIG. 7 and the processed article 101 of FIG. 8 are obtained by continuously processing the positive active material plate 3 and the negative active material plate 4 having the same dimensions and shapes by using similar processes, the film type battery of this embodiment can be efficiently manufactured.

As described above, by using the film type battery of this embodiment, the rise of internal temperature can be controlled to an extremely low value even when power consumption becomes large. Thus, adverse influence on the environment caused by an abnormal rise of internal temperature can be assured. These advantages can be accomplished without producing electric short-circuiting, and productivity can be improved.

The layer-built film type battery is assembled such that the positive active material layer 11, the electrolyte layers 12a and 12b, and the negative active material layer 13 are laminated into a layer structure to form the generating element 1 and plural generating elements 1 are laminated with the positive current collector plates 3 or the negative current collector plates 4 put between them. Both active material layers 11 and 13 and the electrolyte layers 12a and 12b are sealed at their peripheries and both current collector plates 3 and 4 are integrated by the sealing agents 2a and 2b.

Materials for use in both current collector plates 3 and 4, the active materials, the electrolytes and the sealing agents 2a and 2b are same as those of the first embodiment.

The portions 31 and 41, similar to those of the first embodiment, are installed on the positive current collector plate 3 and the negative current collector plate 4, and portions 31 and 41 are located at opposite sides of the layer-built film type battery. In other words, portion 31 and portion 41 are so installed as not to be superimposed upon each other when the layer-built film type battery is seen in plan view.

Figure 12:
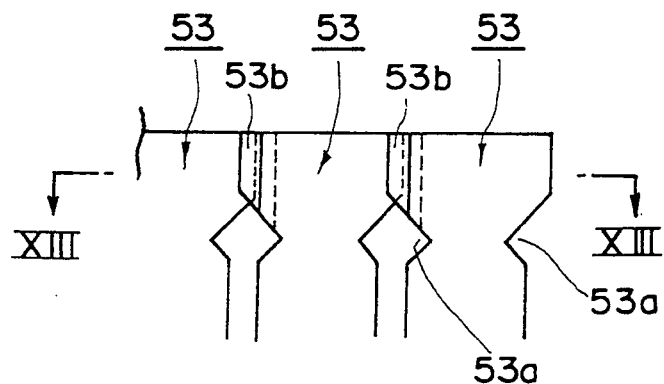
FIG. 12 is a plan view showing neighboring terminal pieces assembled in the battery of the second embodiment.
Figure 13:
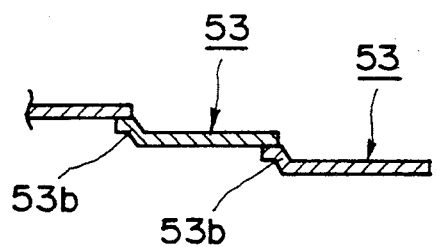
FIG. 13 is a sectional view taken on the line XIII—XIII of FIG. 12.

The terminal pieces 53 and 54, on which the notches 53a and 54a are formed in the same way as in the first embodiment, are fitted to one side of the positive current collector plate 3 and the negative current collector plate 4, respectively, in the same way as in the first embodiment, that is, in such a way as not to be superimposed upon each other when the layer-built film type battery is seen in plan view. The terminal pieces 53 and 54 are narrowed at their rear between the notches 53a and 54a their respective positive current collectors and negative current collectors, respectively. The respective terminal pieces 53 are so fitted as to partially overlap only at their front parts when the layer-built film type battery is seen in plan view. The terminal pieces 54 are fitted in the same way. All of the terminal pieces 53 are joined integrally to each other as illustrated by FIGS. 12 and 13. The adjoining terminal pieces 53 are joined by bending a side portion 53b of the front part of one terminal piece 53 to a side portion 53b of the front part of another terminal piece 53 to be in contact with it. The terminal pieces 54 are joined in the same way. All of the terminal pieces 53 are integrally then made integral with each other by melting zinc which has been coated previously on their tip ends, and all of the terminal pieces 54 are then joined to each other in the same way. Tin-zinc alloy or tin-lead alloy may be used in place of the zinc.

Figure 14:
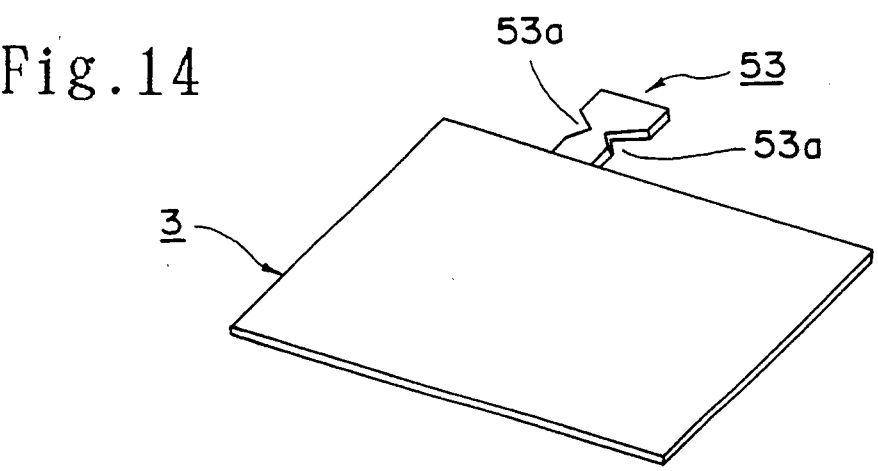
FIGS. 14 to 19 are perspective views showing the steps of the process for forming the layer-built film type battery of the second embodiment 2 of the invention.
Figure 15:
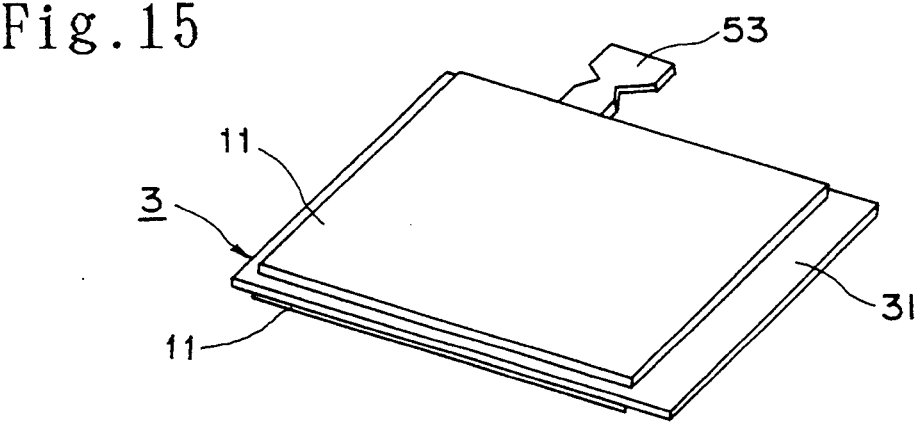

The layer-built film type battery having such structure is formed by way of the process shown in FIGS. 14 to 19. First, the positive current collector plate 3 provided with the terminal piece 53 as shown in FIG. 14 is prepared. The front part of the terminal plate 53 is previously coated with a fine powder of zinc by blowing while masking its rear part beyond the notch 53a. A positive active material is screen printed on the front and back surfaces of the positive current collector plate 3 to form a positive active material layer 11 as shown in FIG. 15. In this instance, the area of the positive active material layer 11 is the same as that of the first embodiment.

Figure 16:
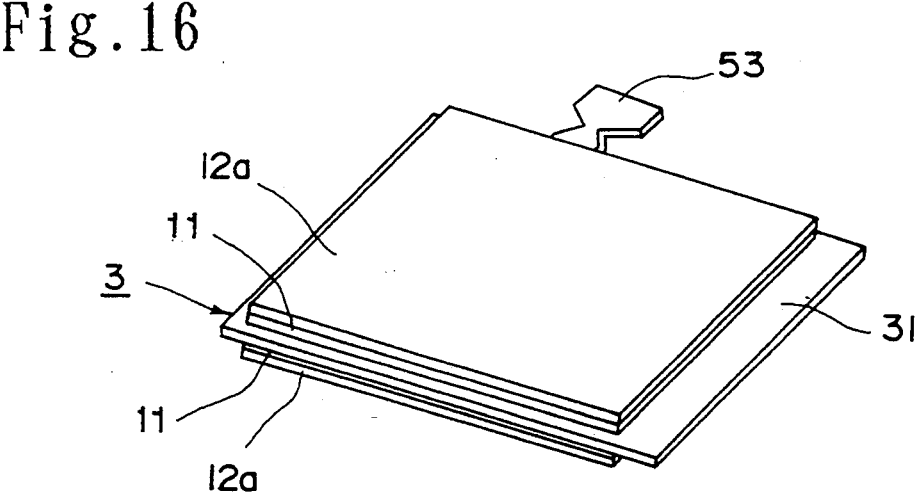
Figure 17:
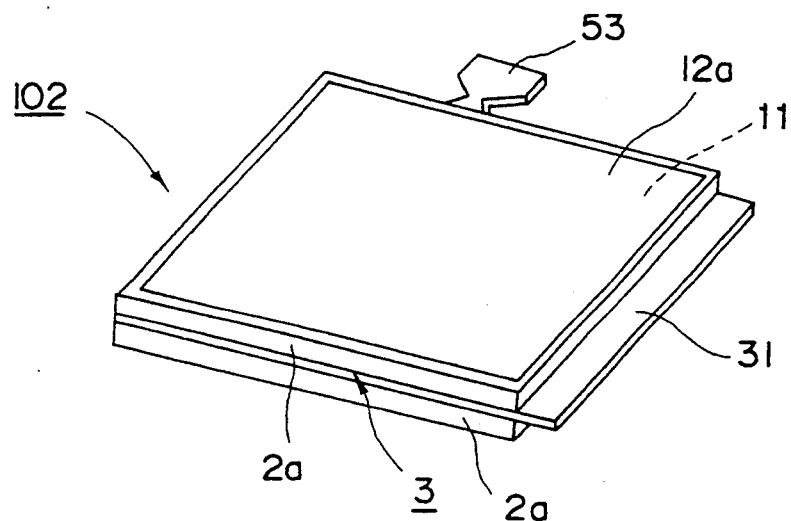

Next, an electrolyte is screen printed on the positive active material layers 11 of both surfaces to form the electrolyte layers 12a as shown in FIG. 16. Then, the sealing agents 2a are put on and bonded to the peripheries of the positive active material layers 11 and the electrolyte layers 12a of both surfaces so as to obtain a processed article 102 as shown in FIG. 17. The sealing agents 2a are applied in the same way as those of the first embodiment.

The negative current collector plate 4 having the same dimensions and shapes as those of the positive current collector plate 3 of FIG. 14 is prepared the same way. The negative active material layers 13 and the electrolyte layers 12b are formed on the front and back surfaces of the negative current collector plate 4 the same way as those of FIGS. 14 to 16, and the sealing agents 2b are further formed so as to obtain a processed article 103 shown in FIG. 18.

A processed article 100 as shown in FIG. 7 and a processed article 101 as shown in FIG. 8 are formed in the same way as the first embodiment.

Figure 10:
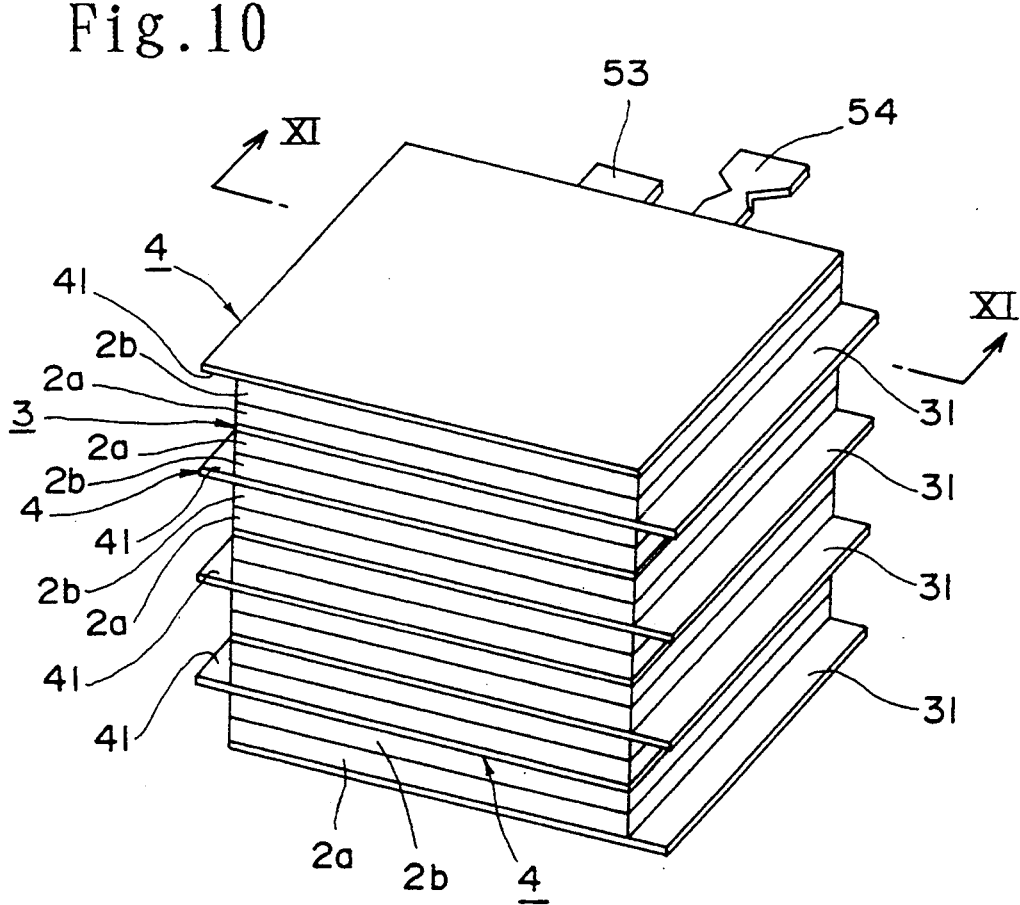
FIG. 10 is a perspective view showing a layer-built film type battery according to a second embodiment of the invention.
Figure 11:
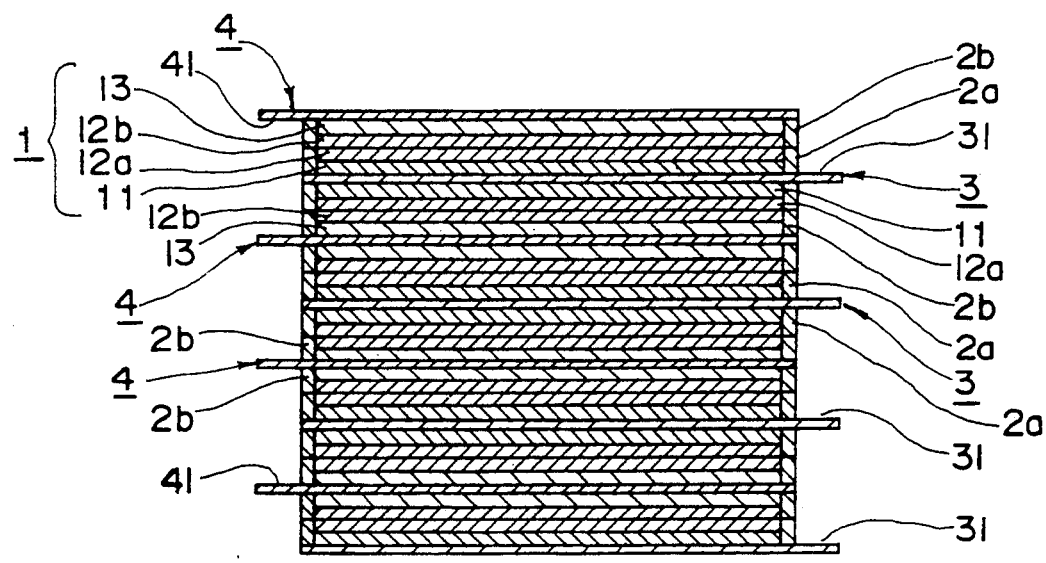
FIG. 11 is a sectional view taken on the line XI—XI of FIG. 10.
Figure 18:
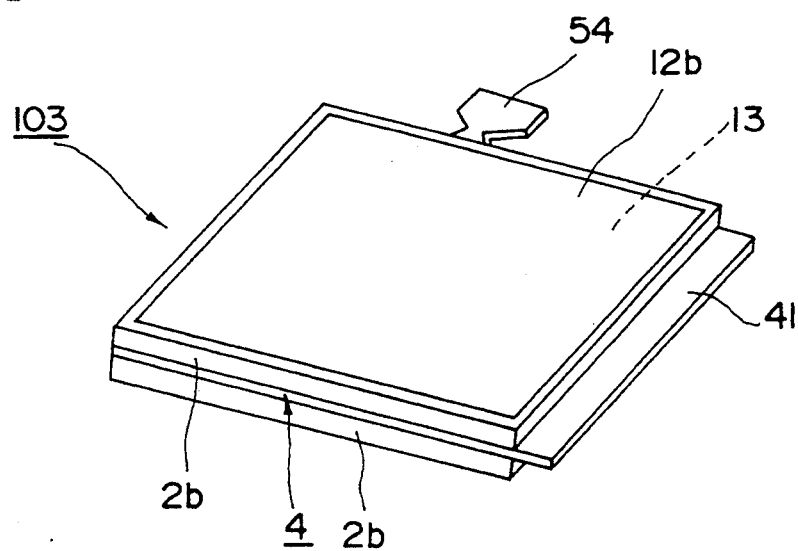
Figure 19:
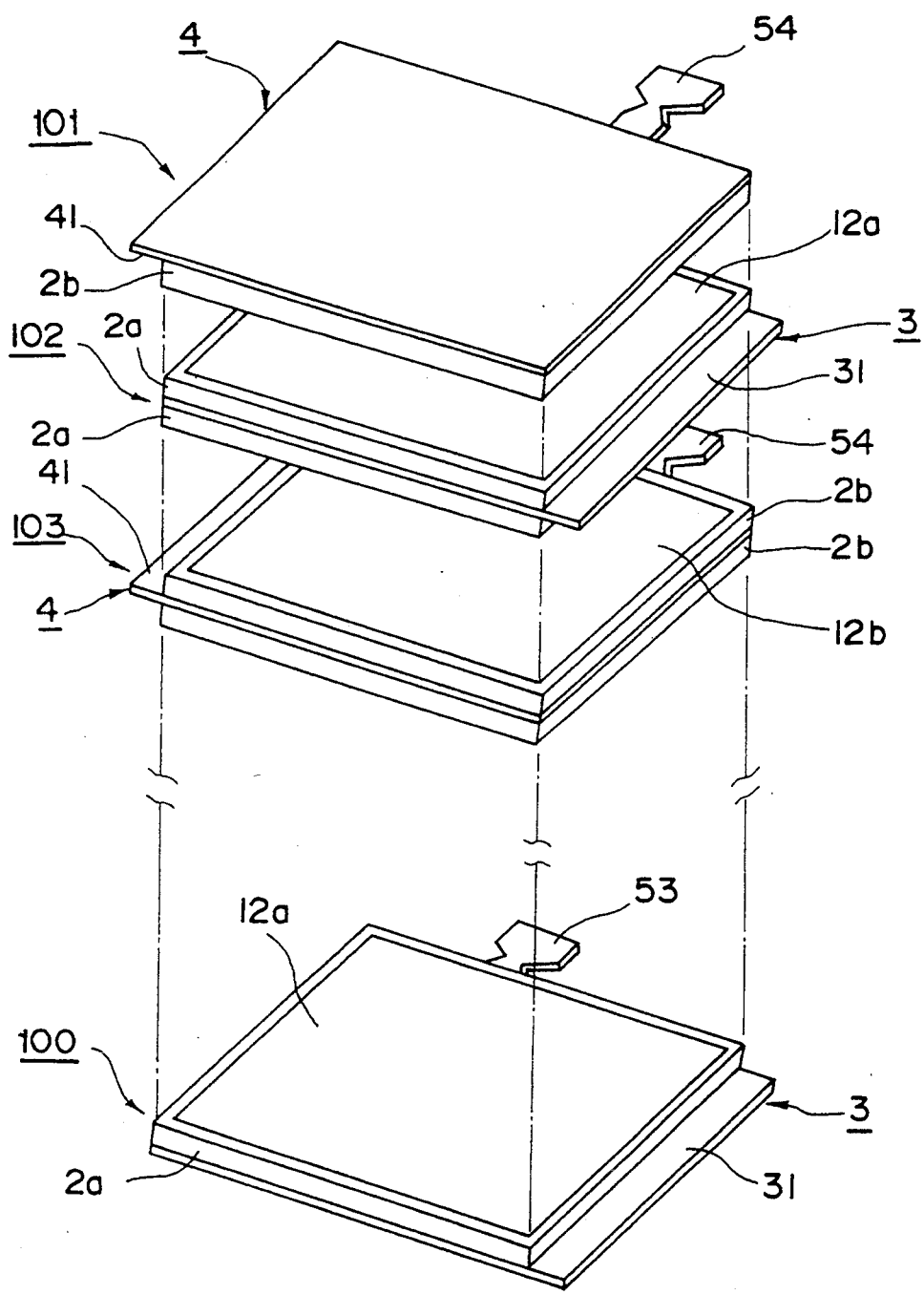
Figure 20:
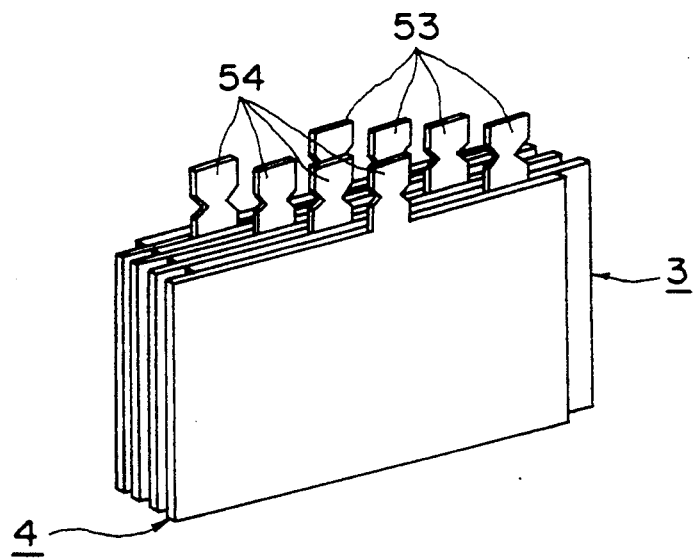
FIG. 20 is a perspective view showing an assembly obtained by the process of FIGS. 14 to 19 with the terminal pieces positioned at the top as viewed in FIG. 20.

Three of the processed article 102 of FIG. 17 and three of the processed article 103 of FIG. 18 are prepared. As shown in FIG. 19, the processed article 101 and the processed article 100 are disposed at the uppermost and lowermost positions, three sets of the processed article 102 and the processed article 103 which are put face to face so as to locate the portion 31 and the portion 41 at opposite sides, are disposed between the processed article 101 and the processed article 100. They are laid one upon another at portions of the electrolyte layers 12a and 12b and the sealing agents 2a and 2b are thermally bonded to each other under reduced pressure, so that the inside surrounded by both current collector plates 3 and 4 and the sealing agents 2a and 2b is under reduced pressure and hermetically sealed. The three processed articles 102 and the processed article 100 are formed by using the positive current collector plates 3 fitted with the terminal pieces 53 at different positions respectively, and the respective terminal pieces 53 are so disposed as to be located at positions as shown in FIG. 12. The terminal pieces 54 for the three processed articles 103 and the processed article 101 are disposed in the same way. FIG. 20 shows an assembly thus obtained with the terminal pieces 53 and 54 positioned at the top as seen in FIG. 20. As shown in FIG. 12, the bent side portions 53b of the terminal pieces 53 are thermally bonded so as to join all of the terminal pieces 53 integrally with each other, and all of the terminal pieces 54 are also joined integrally to each other in the same way. Thereby, the layer-built film type battery of this embodiment shown in FIG. 10 can be obtained. The thickness of the generating element 1 is 0.2 to 1.0 mm.

Figure 28:
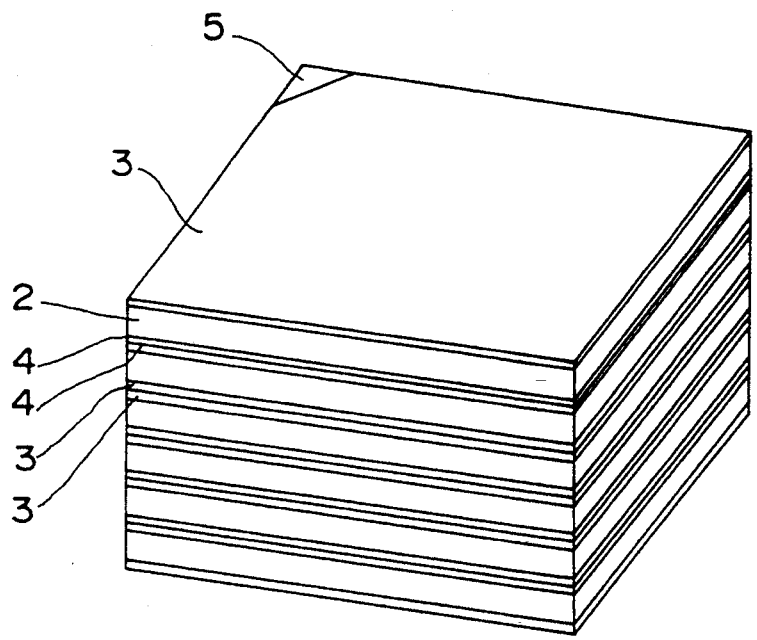
FIG. 28 is a perspective view showing a conventional layer-built film type battery.

In the layer-built film type battery of this embodiment, heat radiation is also efficient because the portions 31 of the positive current collector plates 3 and the portions 41 of the negative current collector plates 4 function as radiation fins in the same way as the embodiment 1. Therefore, with the layer-built film type battery of this embodiment, the rise of internal temperature can be controlled even when power consumption becomes large. Maximum values of internal temperature at high-rate discharge were examined on the layer-built film type battery of this embodiment and a conventional layer-built film type battery shown in FIG. 28. The value was 69° C. for the conventional battery but it was 28° C. for the battery of this embodiment. In other words, the rise of internal temperature is controlled to an extremely low value in the battery of this embodiment.

In addition, since portions 31 and portions 41 are located at opposite ends, that is, they are so installed as not to be superimposed upon each other when the layer-built film type battery is seen in plan view, electric short-circuiting does not occur. Further, since the terminal pieces 53 and 54 are also so installed as not to be superimposed upon each other in the same way as the first embodiment when the layer-built film type battery is seen in plan view, electric short-circuiting does not occur.

Moreover, since the notches 53a and 54a are formed on the terminal pieces 53 and 54 so that they are constricted at their middle portions, the pieces will melt at the narrowed portions when consumed power exceeds a specified limit. In other words, the terminal pieces 53 and 54 also function as fuses. Furthermore, they are narrowed at the rear portions beyond the notches 53a and 54a. The terminal pieces 53 are so fitted that only their front portions are superimposed upon each other when the layer-built film type battery is seen in plan view. The terminal pieces 54 are also fitted in the same way. Therefore, mutual contact of the terminal pieces 53 and mutual contact of the terminal pieces 54, i.e., electric connections of molten terminal pieces caused by fusing can be prevented. Consequently, the fuse function can be utilized, thereby preventing the generating element 1 from becoming faulty and avoiding an abnormal rise of internal temperature, so that environmental damage caused by fire and bursting of the battery can be prevented.

The processed article 102 of FIG. 17 and the processed article 103 of FIG. 18 are obtained by continuously processing the positive current collector plate 3 and the negative current collector plate 4 having similar dimensions and shapes by using similar processes. Since the front parts of respective terminal pieces 53 and 54 are previously coated with zinc, the terminal pieces 53 are easily joined to each other and the terminal pieces 54 are easily joined to each other. Therefore, the layer-built film type battery of this embodiment can be efficiently manufactured.

As described above, with the layer-built film type battery of this embodiment, the rise of internal temperature can be controlled to an extremely low value even when the consumed power becomes large, environmental damage caused by an abnormal rise of internal temperature can be prevented. These advantages can be achieved without causing electric short-circuiting, and productivity can be improved.

Figure 21:
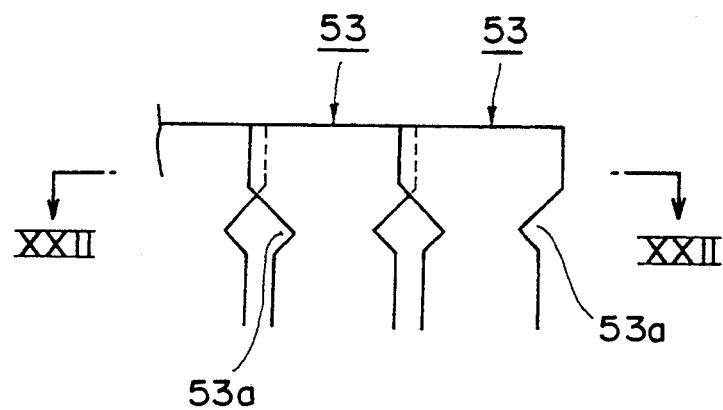
FIG. 21 is a plan view showing another example of neighboring terminal pieces assembled in the battery.
Figure 22:
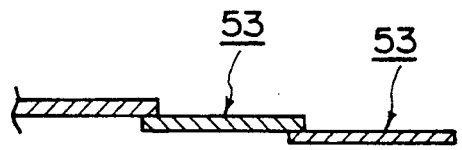
FIG. 22 is a sectional view taken on the line XXII—XXII of FIG. 21.

The adjoining terminal pieces 53 or 54 may be joined as illustrated in FIGS. 21 and FIG. 22 is a sectional view taken on the line XXII—XXII of FIG. 21. The adjoining terminal pieces may be joined without bending the sides of the front portions.

Figure 23:
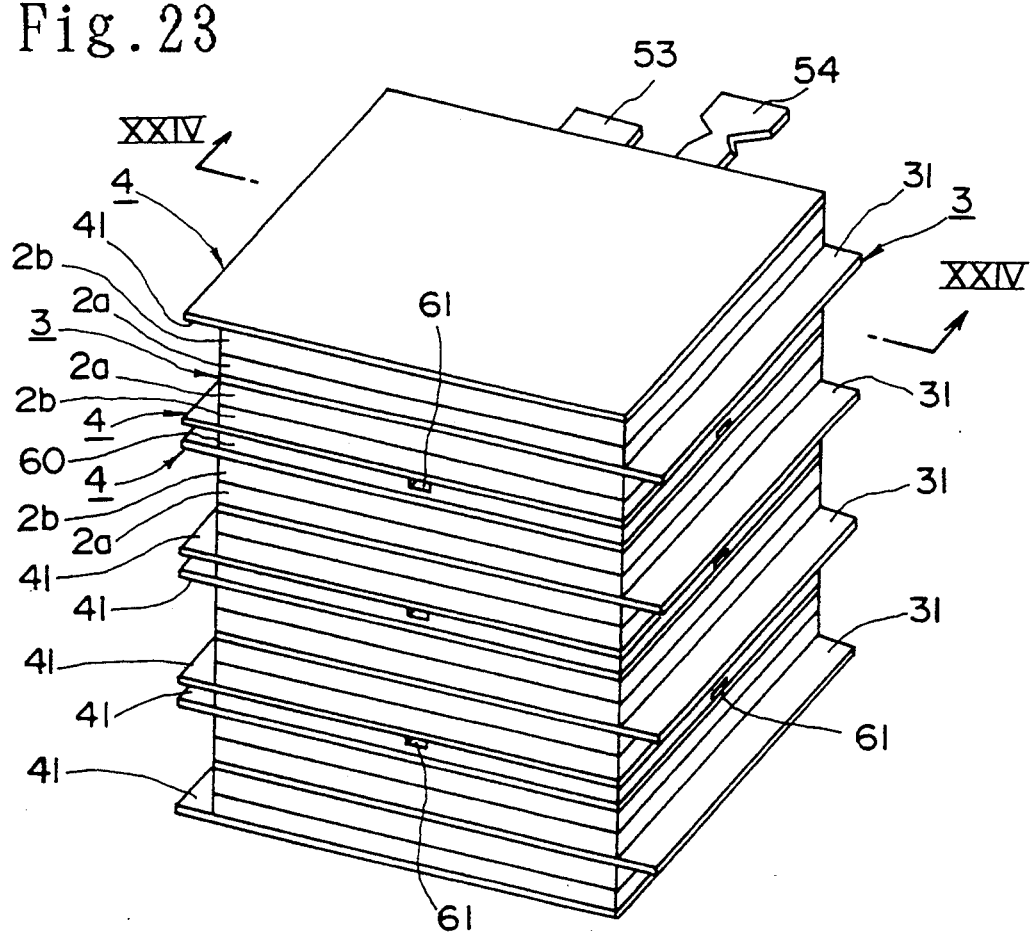
FIG. 23 is a perspective view showing a layer-built film type battery according to a third embodiment of the invention.
Figure 24:
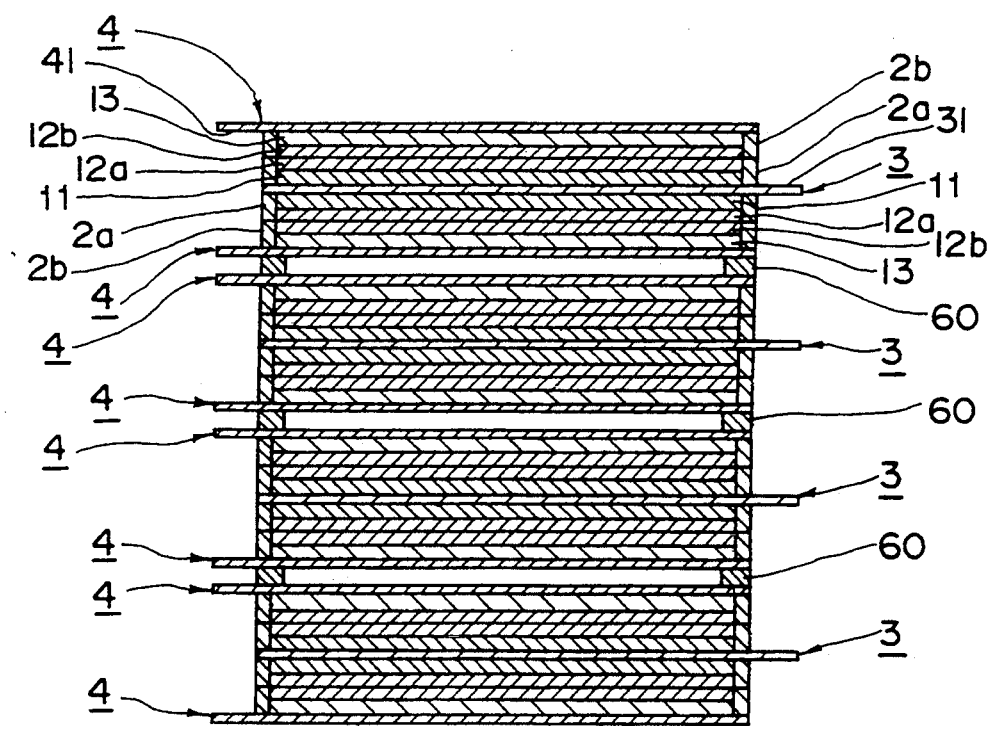
FIG. 24 is a sectional view taken on the line XXIV—XXIV of FIG. 23.

The layer-built film type battery shown in FIGS. 23 and 24 is the same as that of the first embodiment in that it is assembled in such a way that the positive active material layer 11, the electrolyte layers 12a and 12b, and the negative active material layer 13 are laminated into a layer structure to form the generating element 1, and plural generating elements 1 are laminated with the positive current collector plates 3 or the negative current collector plates 4 put between them. However, the generating elements 1 provided with both current collector plates 3 and 4 are laminated with frame members 60 forming ventilating spaces placed between predetermined numbers of generating elements 1, between every two elements in this instance. The remaining structure is the same as that of the second embodiment. Certain components used in this embodiment and shown in FIGS. 23 and 24 are the same as corresponding components used in the second embodiment and it should be understood that like elements in the drawings bear like numbers.

The frame member 60 has grooves 61 at predetermined positions on the four sides so that ventilation between the inside and outside is enabled by the grooves 61 and a ventilation space is formed inside. Holes passing from the inside to the outside may be provided in place of the grooves 61.

Figure 25:
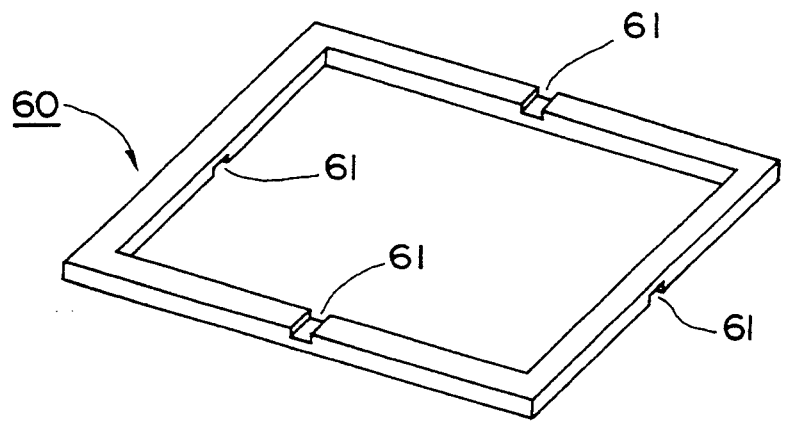
FIG. 25 is a perspective view showing a frame material for use in the battery of the third embodiment.
Figure 26:
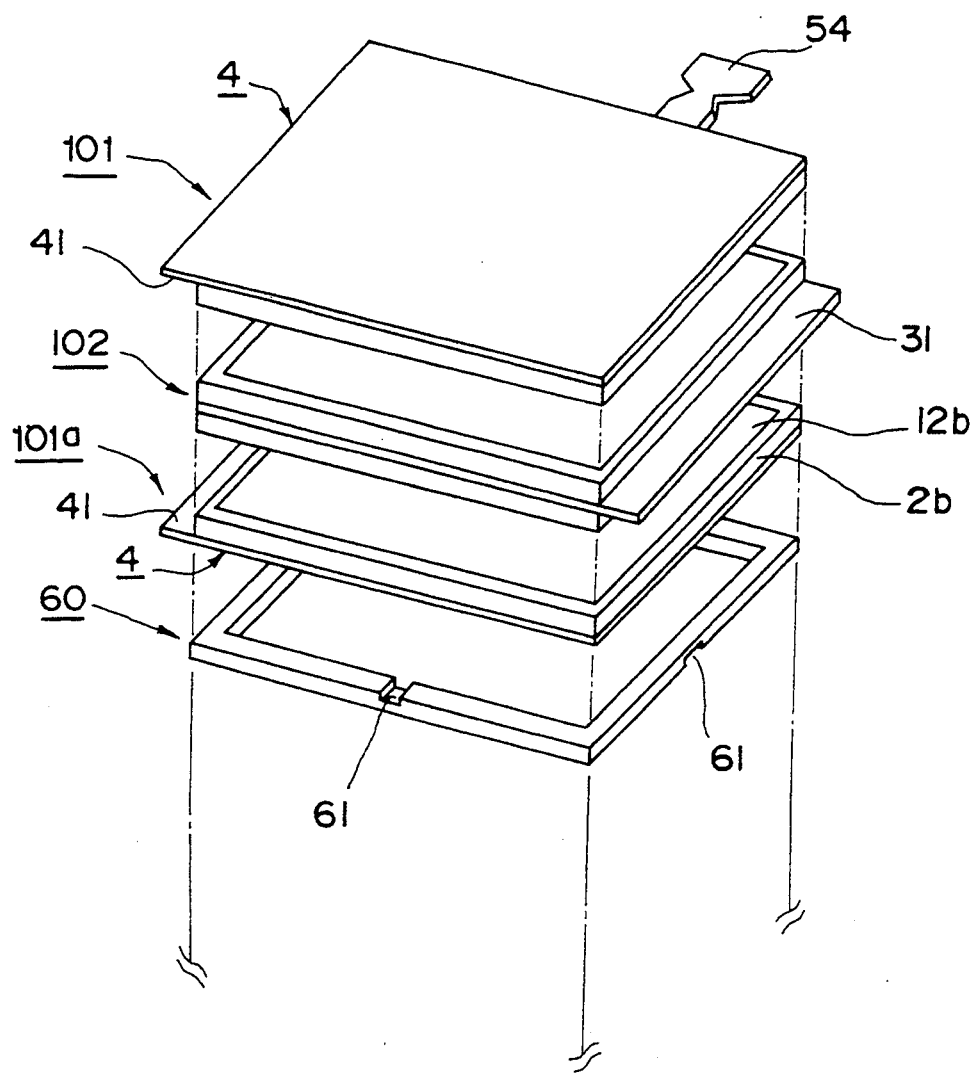
FIG. 26 is a perspective view showing a process for forming the battery of the third embodiment.

The film type battery having the structure just described is formed as shown in FIG. 26 by laminating the processed article 101 of FIG. 8, the processed article 102 of FIG. 17, a processed article 101a formed by moving the generating element 1 to the side opposite the side of the processed article 101, and the frame material 60 of FIG. 25 etc., in the same way as the second embodiment.

In the layer-built film type battery of this embodiment, heat is also radiated from a surface of the negative current collector plate 4 facing on the frame member 60 because a ventilation space is provided by the frame member 60. Therefore, heat radiation is accomplished much better than in the second embodiment, and a rise of the internal temperature can be better controlled even when the power consumption becomes large. Maximum values of internal temperature at a high-rate of discharge were determined comparing the layer-built film type battery of this embodiment with the conventional layer-built film type battery of FIG. 28. The value was 69° C. for the conventional battery but it was 25° C. for the battery of this embodiment. In other words, the rise of internal temperature is controlled to an extremely low value in the battery of this embodiment, as compared not only with the conventional battery but with the battery of the second embodiment. Other functions and effects are the same as those of the second embodiment.

In the layer-built film type battery of this embodiment shown in FIG. 23, the negative plates protrude from both faces. However, the battery may be assembled such that the positive plates protrude from both faces.

What is claimed is:

1. A film battery comprising a positive current collector plate, a positive active material, electrolytes, a negative active material and a negative current collector plate laminated into a layer structure,
wherein the positive active material, the negative active material and the electrolytes are peripherally sealed the positive current collector plate and the negative current collector plate are integrated by sealing agents, a portion of the positive current collector plate and a portion of the negative current collector plate are not contacted by the active material, the electrolytes or the sealing agents, a positive terminal piece is fitted to the positive current collector plate at a side of the layer structure and a negative terminal piece is fitted to the negative current collector plate at the side of the layer structure.

2. A film battery comprising a positive current collector plate, a positive active material, electrolytes, a negative active material and a negative current collector plate laminated into a layer structure,
wherein the positive active material, the negative active material and the electrolytes are peripherally sealed, the positive current collector plate and the negative current collector plate are integrated by sealing agents, a portion of the positive current collector plate and a portion of the negative current collector plate are not contacted by the active material, the electrolytes or the sealing agents, a positive terminal piece is fitted to the positive current collector plate at a side of the layer structure, a negative terminal piece is fitted to the negative current collector plate at the side of the layer structure and the positive and negative terminal pieces are laterally constricted at the middle portions thereof.

3. A film battery comprising a positive current collector plate, a positive active material, electrolytes, a negative active material and a negative current collector plate laminated into a layer structure,
wherein the positive active material, the negative active material and the electrolytes are peripherally sealed, the positive current collector plate and the negative current collector plate are integrated by sealing agents, a portion of the positive current collector plate and a portion of the negative current collector plate are not contacted by the active material, the electrolytes or the sealing agents, a positive terminal piece is fitted to the positive current collector plate at a side of the layer structure, a negative terminal piece is fitted to the negative current collector plate at the side of the layer structure and the terminal piece of the positive current collector plate and the terminal piece of the negative current collector plate are so fitted as not to be laid one upon another when they are viewed from a plan view position.

4. A film battery comprising a positive current collector plate, a positive active material, electrolytes, a negative active material and a negative current collector plate laminated into a layer structure,
wherein the positive active material, the negative active material and the electrolytes are peripherally sealed, the positive current collector plate and the negative current collector plate are integrated by sealing agents, a portion of the positive current collector plate and a portion of the negative current collector plate are not contacted by the active material, the electrolytes or the sealing agents, a positive terminal piece is fitted to the positive current collector plate at a side of the layer structure, a negative terminal piece is fitted to the negative current collector plate at the side of the layer structure and the portion of the positive current collector plate not contacted by the active material, the electrolyte or the sealing agent and the portion of the negative current collector plate not contacted by the active material, the electrolyte or the sealing agent are so installed as not to be laid one upon another when they are viewed from a plan view position.

5. A layer-built film battery, in which a positive active material, electrolytes and a negative active material are laminated into a layer structure to form a generating element, plural generating elements are laminated with positive current collector plates or negative current collector plates put between them, and the both active materials and the electrolytes are sealed at their peripheries and the both current collector plates are integrated by sealing agents; characterized by that portions where the active materials, the electrolytes and the sealing agents do not exist are left on respective current collector plates, terminal pieces are fitted to one sides of respective current collector plates, and all of the terminal pieces for the positive current collector plates are jointed with each other and all of the terminal pieces for the negative current collector plates are jointed with each other, respectively.

6. A layer-built film battery, in which a positive active material, electrolytes and a negative active material are laminated into a layer structure to form a generating element, plural generating elements are laminated with positive current collector plates or negative current collector plates put between them, and the both active materials and the electrolytes are sealed at their peripheries and the both current collector plates are integrated by sealing agents; characterized by that portions where the active materials, the electrolytes and the sealing agents do not exist are left on respective current collector plates, the generating elements provided with the both current collectors are laminated with frame materials forming ventilating spaces put between them on every voluntary quantity of generating element, terminal pieces are fitted to one sides of respective current collector plates, and all of the terminal pieces of the positive current collector plates are jointed with each other and all of the terminal pieces of the negative current collector plates are jointed with each other, respectively.

7. A layer-built film battery as set forth in claim 5, in which the terminal pieces are laterally constricted at the middle portions thereof.

8. A layer-built film battery as set forth in claim 5 in which the terminal pieces of the positive current collector plates and the terminal pieces of the negative current collector plates are so fitted as not to be laid one upon another when they are viewed from a plan view position.

9. A layer-built film battery as set forth in claim 5 in which the terminal pieces are made narrow at their middle portions, rear portions are made smaller in widths than those of front portions beyond the narrowed portions, the terminal pieces of the positive current collector plates are so fitted that only front parts are laid one upon another when they are viewed from a plan view position and the terminal pieces of the negative current collector plates are also so fitted that only front parts are laid one upon another when they are viewed from the plan view position.

10. A layer-built film battery as set forth in claim 5 in which the portions of the positive current collector plates where the active materials, the electrolytes and the sealing agents do not exist and the portions of the negative current collector plates where the active materials, the electrolytes and the sealing agents do not exist, are so installed as not to be laid one upon another when they are viewed from a plan view position.

11. A layer-built film battery as set forth in claim 5 in which the terminal pieces are jointed with each other by melting zinc, tin-zinc alloy or tin-lead alloy which are previously coated on their tip ends.

12. A layer-built film battery as set forth in claim 6, in which the terminal pieces are laterally constricted at the middle portions thereof.

13. A layer-built film battery as set forth in claim 6, in which the terminal pieces of the positive current collector plates and the terminal pieces of the negative current collector plates are so fitted as not to be laid one upon another when they are viewed from a plan view position.

14. A layer-built film battery as set forth in claim 6, in which the terminal pieces are made narrow at their middle portions, rear portions are made smaller in widths than those of front portions beyond the narrowed portions, the terminal pieces of the positive current collector plates are so fitted that only front parts are laid one upon another when they are viewed from a plan view position and the terminal pieces of the negative current collector plates are also so fitted that only front parts are laid one upon another when they are viewed from the plan view position.

15. A layer-built film battery as set forth in claim 6, in which the portions of the positive current collector plates where the active materials, the electrolytes and the sealing agents do not exist and the portions of the negative current collector plates where the active materials, the electrolytes and the sealing agents do not exist, are so installed as not to be laid one upon another when they are viewed from a plan view position.

16. A layer-built film battery as set forth in claim 6, in which the terminal pieces are jointed with each other by melting zinc, tin-zinc alloy or tin-lead allow which are previously coated on their tip ends.

* * * * *